Jan. 11, 1955 R. W. ROGERS 2,699,063
DEVICE FOR MEASURING FORCE
Filed July 1, 1952 2 Sheets-Sheet 1

INVENTOR.
Robert W. Rogers
BY
Barlow & Barlow
ATTORNEYS.

Jan. 11, 1955 R. W. ROGERS 2,699,063
DEVICE FOR MEASURING FORCE
Filed July 1, 1952 2 Sheets-Sheet 2

INVENTOR.
Robert W. Rogers
BY
Barlow & Barlow
ATTORNEYS.

United States Patent Office 2,699,063
Patented Jan. 11, 1955

2,699,063

DEVICE FOR MEASURING FORCE

Robert W. Rogers, Barrington, R. I., assignor to Scott Testers, Inc., a corporation of Rhode Island Application July 1, 1952, Serial No. 296,581

8 Claims. (Cl. 73—141)

This invention relates to a device for very accurately measuring applied force, such for instance as may occur in a testing or weighing machine. The general structure of the apparatus is shown in my copending application Serial No. 255,293, filed November 7, 1951, to which application reference is made.

One of the objects of the invention is to provide a device which will measure applied force with very minute movement such as may exist in the tension or compression of metal.

Another object of the invention is to provide a device in which the minute movement may be measured whether in a compressive relation or a tension relation of the parts under test.

Another object of the invention is to provide a device in which the range of operation may be readily changed so that by the substitution of one unit the range of the device may be changed to other ranges for similar operation.

With these and other objects in view, the invention consists of certain novel features of construction as will be more fully described and particularly pointed out in the appended claims.

In proceeding with this invention, I utilize a gauge whose full-scale operation comprises a minute movement in the order of .0015 of an inch for its operation and is of the character illustrated in Patent 2,453,601. In utilization of a device of this character I provide a diaphragm which may be laterally deflected against its inherent tension to return to a plane and provide a clamp on this diaphragm which will secure to the movable portion thereof a rod through which movement of the diaphragm may be transmitted to a gauge. Very minute movements of the diaphragm will be measured by the gauge above indicated, and the force may be applied either in tension or compression upon some object or the work under test. Because the deformation of the diaphragm is proportional to the force applied, the electrical output is in linear relationship to that force and may be translated for use by any of the well-known forms of indicating or recording apparatus.

Figure 1:
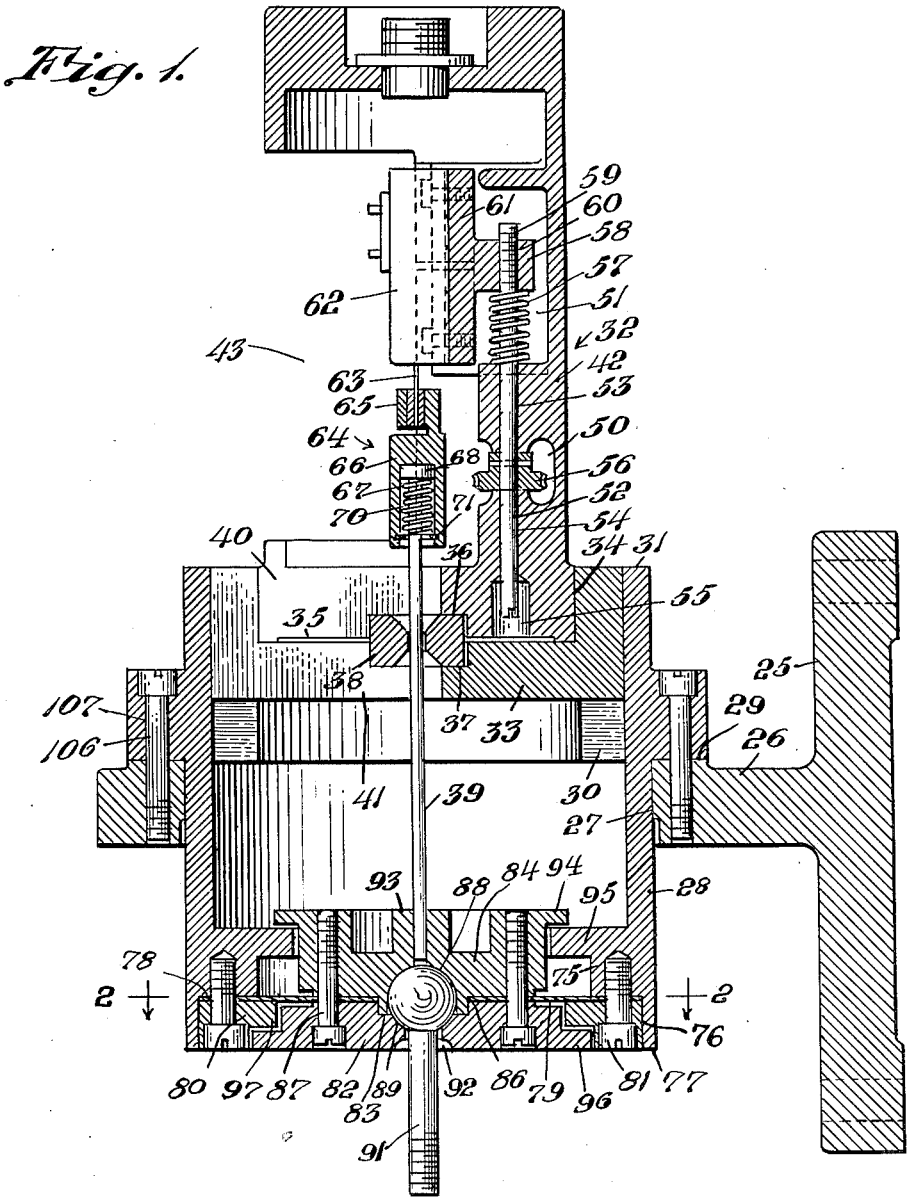
Figure 1 is a sectional view showing the arrangement of the gauge and operating parts.

With reference to the drawings, Figure 1 shows a bracket 25 having a shelf 26 extending therefrom provided with a cylindrical opening 27 in which there is fixed a cylindrical housing 28 having a shoulder at 29 to engage the margin of the cylindrical opening 27 so that the housing may rest in this bracket. This cylindrical housing is generally hollow but is provided with an inwardly extending flange 30 at a point spaced from its upper end 31.

A frame designated generally 32 is mounted in the housing 28 by the same seating into a cup member 33 which is recessed as at 34 to receive it, this member 33 being set upon the flanges 30 of the housing and clamped in this position by appropriate fasteners. The frame 32 is secured in the recess 34 in aligned position by means of dowels and screws not shown in this application but which are more fully illustrated in my co-pending application Serial No. 296,582 filed July 1, 1952. The lower portion of this frame 32 is recessed as at 35 so that its outer periphery alone engages the member 33, it being further recessed as at 36, while the member 33 is recessed as at 37 so as to receive and hold a guide 38 for the rod 39 which transmits motion to the gauge. The lower portion of the frame 32 is slotted as at 40, while the member 33 is also slotted as at 41 to register therewith for the reception of the rod 39 inwardly from the open end of the slot.

This frame 32 has a portion 42 which extends upwardly from its base, which portion is cut away on its front side as at 43 and is recessed in its back portion as at 50 and again recessed at at 51. Shaft 52 extends through a bore 53 joining the recesses 50 and 51 and through the bore 54 which is in axial alignment with the bore 53 which joins the recess 50 and the recess 55 in the lower portion of the frame 32. A worm wheel 56 located in recess 50 is secured to this shaft 52 and is rotatable for rotating the shaft for adjustment purposes. A spring 57 extends between one end of the recess 51 and against the lower end of a boss 58 to take up back lash at the threaded end 59 of the shaft which threadedly engages the opening 60 through a boss which extends from the carrier 61 upon which the gauge 62 is secured by means of screws.

This gauge 62 is of the type illustrated in Patent 2,453,601 and has a stem 63 extending downwardly therefrom to be engaged by a coupling 64 when tension is applied and which comprises a clamp 65 for the member 63 and a body portion 66 recessed as at 67 to receive the head 68 secured on the end of the rod 39, while a spring 70 extends between the under side of this head 68 and the split ring 71 which is removably held in the recess for housing the head 68 and spring 70 and which furnishes an abutment for the lower end of the spring.

At the lower portion of the housing there extends inwardly an annulus 75 with a recess 76 extending from the lower end 77 of the housing inwardly and providing a shoulder 78 which provides a seat for the diaphragm 79 which is clamped against the shoulder 78 by means of a ring 80 and cap screws 81 passing through the ring and into the annulus 75. The diaphragm 79 has secured to its center deflectable portion a clamp comprising a lower member 82 recessed as at 83 and an upper member 84 with a projection which extends through the center opening 86 of the diaphragm and into the recess 83. Cap screws 87 pass through the upper and lower members of the clamp and through the diaphragm, the cap screws being threaded in the member 84 so as to bind the parts together. The recess 88 which is a portion of a sphere is formed in the lower surface of the clamp part 84 and a recess 89 also a portion of a sphere is formed in the upper part of the lower portion 82 so that a ball 90 may be held in this recess. The ball has a stem 91 which projects through an opening 92 in the lower member 82 of the clamp which opening is much larger than the size of the stem 91, thus permitting some movement of the stem by rocking of the ball in its socket and which may permit of adjustment in the alignment of the force applied. The motion transmitting rod 39 is fixed in the opening 93 in the upper member 84 of the clamp such as by welding.

Figure 2:
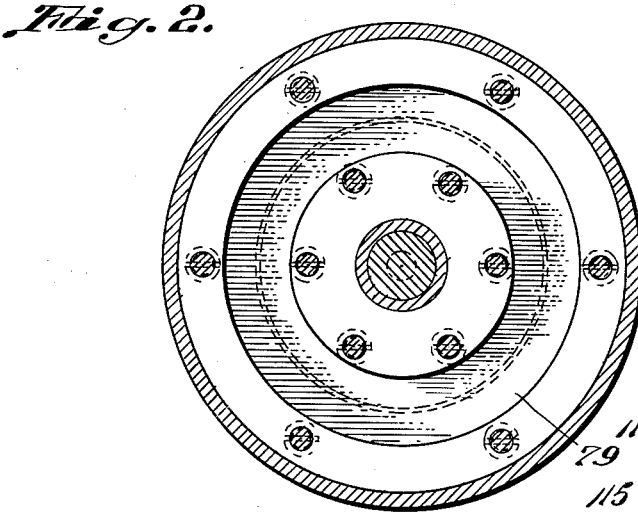
Figure 2 is a section on line 2—2 of Figure 1.

The diaphragm which I have illustrated may be a plain plate as shown in Figures 1 and 2 and which may have one range of capacities which will permit it to return to its first position. In order that the diaphragm will not be strained, the upper portion of the clamp is flanged as at 94 to engage the flange 95 extending from the annulus 75, while the lower plate is flanged as at 96 to engage the flange 97 extending from the ring 80, thus limiting the movement which may occur in the deflection of the diaphragm 79.

Figure 3:
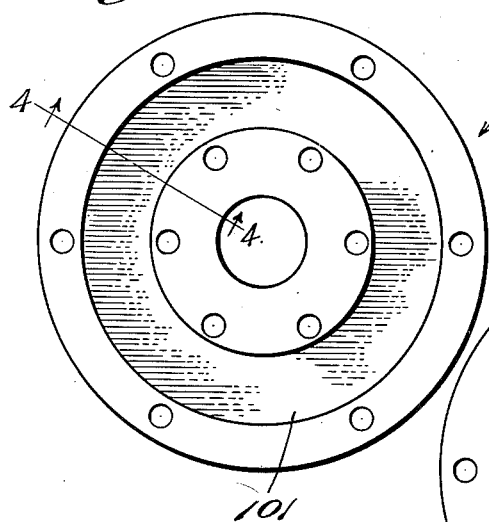
Figure 3 is a modified form of diaphragm.
Figure 5:
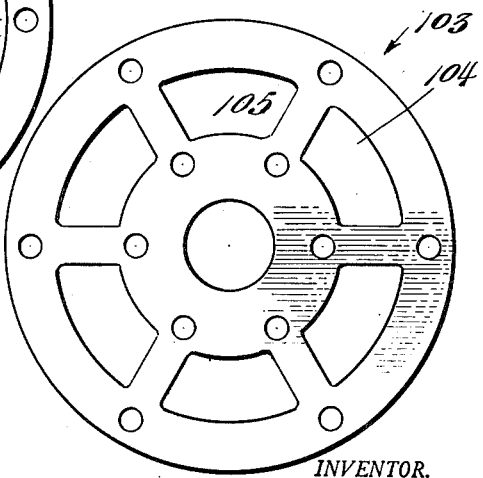
Figure 5 is a top plan view of a still different modified form of diaphragm.
Figure 4:
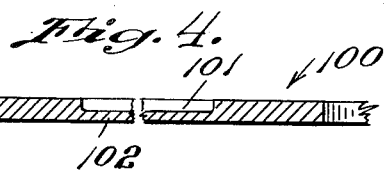
Figure 4 is a section on line 4—4 of Figure 3.

In case it is desired to have a diaphragm of a different capacity, instead of having a flat plate such as 79, a plate 100 as shown in Figure 3 may be provided being generally much thicker but recessed as at 101 to provide a web 102 of the capacity which may be desired for the range of force to be accommodated. In some cases instead of a recess such as provided at 101, a plate 103 shown in Figure 5 may be provided with portions 104 cut away leaving spokes 105 which may serve in place of the continuous web 102 as shown in Figure 4.

While in some cases it may be satisfactory to change diaphragms, it is usually more convenient to have diaphragms of the capacities desired mounted in housings 28 and then remove the housing such as by means of screws 106 passing through the flange 107 of the housing into the ring 26, it being also good practice to remove the frame 32 from the housing, substituting a new housing with a different diaphragm and then returning the frame 32 to the substituted housing.

Figure 6:
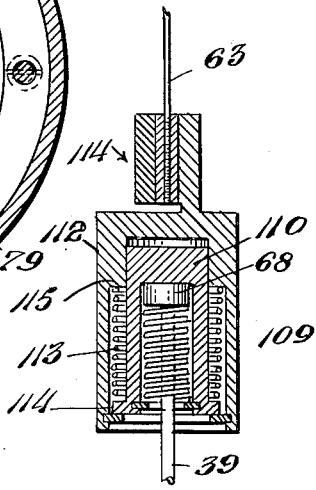
Figure 6 is a section view of a modified form of coupling.

Force is, of course, applied through the stem 91 and is measured by the gauge 62 in tension. Should a greater force than the gauge will stand be applied, then the spring 70 will yield to protect the gauge, while the diaphragm is protected by the stops 94, 95 in tension, or if the work is being tested in compression, the stops 96, 97 are used to protect the diaphragm. When in compression, a different coupling 64 will be necessary such as that shown in Figure 6 in which the rod 39 and its head 68 will be received in recess 109 of member 110 to be urged in one direction by spring 111, while the member 110 is received in housing 112 and urged in the opposite direction by spring 113 acting between flange 114 and the shoulder 115 of the housing 112. The clamp 114 for stem 63 is as above described in connection with clamp 65.

I claim:

1. A device for measuring force comprising a support, a housing, a diaphragm capable of lateral deformation carried by said housing, a rod secured to the deformable portion of said diaphragm on one side thereof to move therewith, a frame, means to detachably support the frame on said housing, a gauge supported by the frame, means detachably connecting the gauge to the rod, said rod transmitting the movement of said diaphragm to said gauge, and means secured to the other side of the diaphragm for applying a force on said diaphragm, said housing being detachably secured to said support; whereby said housing may be removed and replaced by a housing having a diaphragm of different capacity.

2. A device as in claim 1 wherein the diaphragm is removably clamped in said housing for interchange with other diaphragms of different capacity.

3. A device as in claim 1 wherein the diaphragm is removably clamped in said housing for interchange with other diaphragms of different capacity, an abutment on said clamp, an abutment on the housing, said abutments co-operating with each other to limit the movement of the clamp and diaphragm.

4. A device as in claim 1 wherein the diaphragm is removably clamped in said housing for interchange with other diaphragms of different capacity, an abutment on said clamp, an abutment on the housing, said abutments co-operating with each other to limit the movement of the clamp and diaphragm in both directions.

5. A device for measuring force comprising a support, a housing secured to said support, a flexible diaphragm secured at its outer periphery to said housing and yieldable in proportion to the force applied thereon, means for measuring a force applied on said diaphragm, including upper and lower clamp elements between which said diaphragm is secured for movement with said diaphragm, a rod secured at one end thereof to said upper clamp element, a coupling carried at the other end of said rod, a gauge carried by said housing and having a stem secured to said coupling whereby the movement of said rod upon flexing of said diaphragm will actuate said gauge, and a force applying member secured between said clamp elements for applying a force on said diaphragm.

6. A device as set forth in claim 5 wherein said clamp elements are each provided with oppositely disposed stops and said housing is provided with spaced abutments engageable by said stops for limiting the flexing of said diaphragm in both directions.

7. A device for measuring force as set forth in claim 5 wherein said housing is detachably secured to said support and a frame is detachably secured to said housing, said gauge being mounted on said frame whereby said gauge and frame may be removed as a unit from said housing and said housing with said diaphragm and said elements attached thereto may be removed from said support as a unit for interchanging with other like units having different capacity.

8. A device for measuring force comprising a support, a housing detachably secured to said support, a flexible diaphragm secured at its periphery to said housing and yieldable in proportion to the force applied thereon, means for measuring a force applied on said diaphragm, including upper and lower clamp elements between which said diaphragm is secured for movement with said diaphragm, a rod secured at one end thereof to said upper clamp element, a resilient coupling carried at the other end of said rod, a frame detachably secured to said housing, a gauge mounted on said frame and having a stem detachably secured to said coupling whereby the movement of said rod upon flexing of said diaphragm will actuate said gauge, and a force applying member secured between said clamp elements for applying a force on said diaphragm, said member being adjustably rockable between said clamp elements about a point lying in the plane of the diaphragm.

References Cited in the file of this patent

UNITED STATES PATENTS

| | | |
|---|---|---|
| 2,004,660 | Hounsfield | June 11, 1935 |
| 2,414,161 | Moore | Jan. 14, 1947 |
| 2,533,279 | Moore et al. | Dec. 12, 1950 |
| 2,561,318 | Ruge | July 17, 1951 |

FOREIGN PATENTS

| | | |
|---|---|---|
| 859,459 | France | June 3, 1940 |